(12) United States Patent
Hindryckx

(10) Patent No.: US 10,436,220 B2
(45) Date of Patent: Oct. 8, 2019

(54) METHOD FOR PRODUCING A COMPRESSOR STATOR OF AN AXIAL TURBOMACHINE

(71) Applicant: Safran Aero Boosters S.A., Herstal (Milmort) (BE)

(72) Inventor: Francois Hindryckx, Esneaux (BE)

(73) Assignee: Safran Aero Boosters SA (BE)

( * ) Notice: Subject to any disclaimer, the term of this patent is extended or adjusted under 35 U.S.C. 154(b) by 227 days.

(21) Appl. No.: 15/326,618

(22) PCT Filed: Jul. 13, 2015

(86) PCT No.: PCT/EP2015/065930
§ 371 (c)(1),
(2) Date: Jan. 16, 2017

(87) PCT Pub. No.: WO2016/015980
PCT Pub. Date: Feb. 4, 2016

(65) Prior Publication Data
US 2017/0204877 A1    Jul. 20, 2017

(30) Foreign Application Priority Data
Jul. 31, 2014 (EP) .................................. 14179303

(51) Int. Cl.
*B29C 65/00* (2006.01)
*F04D 29/54* (2006.01)
(Continued)

(52) U.S. Cl.
CPC ............ *F04D 29/542* (2013.01); *B23K 20/12* (2013.01); *B23K 20/129* (2013.01);
(Continued)

(58) Field of Classification Search
CPC ........... Y10T 29/49321; Y10T 29/4932; Y10T 29/49323; F04D 29/542; F04D 29/023;
(Continued)

(56) References Cited

U.S. PATENT DOCUMENTS

| 5,248,077 A | 9/1993 | Rhoades et al. |
| 6,321,448 B1 | 11/2001 | Makino et al. |

(Continued)

FOREIGN PATENT DOCUMENTS

| EP | 1143108 A1 | 10/2001 |
| EP | 2339120 A1 | 6/2011 |

(Continued)

OTHER PUBLICATIONS

International Search Report from corresponding International Application No. PCT/EP2015/065930, dated Nov. 16, 2015.

*Primary Examiner* — Sarang Afzali
*Assistant Examiner* — Ruth G Hidalgo-Hernandez
(74) *Attorney, Agent, or Firm* — Sandberg Phoenix & von Gontard P.C.

(57) ABSTRACT

The invention relates to a method of producing a low-pressure compressor stator for an axial turbine engine. The stator comprises an external shroud with stubs and an annular row of stator blades extending radially towards the inside from the stubs. The method comprises the following stages: supply or production of a starting bar; bending of the bar so that it makes a circle, in order to form an unwrought external shroud; turning to form an axial annular wall delimited by annular fixing flanges; orbital friction-welding of a row of blades onto the stubs of the external shroud. The stubs are realized during a milling stage of the bar or of the external shroud, the milling being carried out before or after the bending stage. The shroud and the blades can be produced in titanium or in a thermoplastic polymer.

16 Claims, 6 Drawing Sheets

(51) Int. Cl.
*B23P 15/00* (2006.01)
*B23K 20/12* (2006.01)
*B23K 20/233* (2006.01)
*B23K 20/24* (2006.01)
*B23K 20/26* (2006.01)
*F04D 29/02* (2006.01)
*B29C 53/36* (2006.01)
*B29C 65/06* (2006.01)
*B23K 101/00* (2006.01)
*B23K 103/14* (2006.01)
*F01D 9/04* (2006.01)
*B29L 31/08* (2006.01)
*B29K 101/12* (2006.01)
*B23K 103/00* (2006.01)

(52) U.S. Cl.
CPC ............ *B23K 20/233* (2013.01); *B23K 20/24* (2013.01); *B23K 20/26* (2013.01); *B23P 15/006* (2013.01); *B29C 53/36* (2013.01); *B29C 65/0609* (2013.01); *F04D 29/023* (2013.01); *B23K 2101/001* (2018.08); *B23K 2103/14* (2018.08); *B23K 2103/42* (2018.08); *B29C 65/0618* (2013.01); *B29C 65/0636* (2013.01); *B29C 66/532* (2013.01); *B29C 66/61* (2013.01); *B29C 66/73921* (2013.01); *B29K 2101/12* (2013.01); *B29L 2031/08* (2013.01); *F01D 9/044* (2013.01); *F05D 2230/239* (2013.01)

(58) Field of Classification Search
CPC ..... B29C 65/0609; B29C 53/36; B23K 20/24; B23K 20/233; B23K 20/26; B23K 20/12; B23K 20/129; B23K 2103/42; B23K 2103/14; B23K 2101/001; B23P 15/006
See application file for complete search history.

(56) References Cited

U.S. PATENT DOCUMENTS

| 2008/0141531 | A1 | 6/2008 | Paulin et al. | |
|---|---|---|---|---|
| 2011/0150643 | A1* | 6/2011 | Wery | F01D 5/282 |
| | | | | 415/200 |
| 2015/0300182 | A1* | 10/2015 | Mottin | B23P 6/005 |
| | | | | 416/213 R |
| 2015/0308278 | A1* | 10/2015 | Wlasowski | B23K 20/1205 |
| | | | | 29/889.22 |

FOREIGN PATENT DOCUMENTS

| EP | 2535513 A1 | 12/2012 |
|---|---|---|
| EP | 2535516 A1 | 12/2012 |
| FR | 2931715 A1 | 12/2009 |
| WO | 2012084106 A2 | 6/2012 |

\* cited by examiner

METHOD FOR PRODUCING A COMPRESSOR STATOR OF AN AXIAL TURBOMACHINE

CROSS-REFERENCE TO RELATED APPLICATIONS

The present invention is the US national stage under 35 U.S.C. § 371 of International Application No. PCT/EP2015/065930, which was filed on Jul. 13, 2015, and which claims the priority of application EP 14179303.4 filed on Jul. 31, 2014, the content of which (text, drawings and claims) are incorporated here by reference in its entirety.

FIELD

The invention relates to a method of producing an axial turbine engine stator. More precisely, the invention relates to a method of welding a row of blades onto an external shroud of an axial turbine engine. The invention likewise relates to an axial turbine engine comprising a stator produced according to the invention.

BACKGROUND

An axial turbine engine comprises, in a manner known in the art, an external wall allowing an annular flow to be guided. Moreover, this wall can support a plurality of rows of stator blades, allowing the flow to be deviated. The external wall can be realized in the form of a plurality of shrouds forming axial sections of the external wall. These sections are assembled axially and fixed to one another to form the continuous wall.

In the context of a low-pressure compressor, these shrouds may play a structuring part, since they allow the separation spout to be connected to the intermediate casing of the turbine engine. They each support a row of blades.

The stator blades are generally welded onto each shroud so as to form an annular row. This method of fixing allows a robust, rigid one-piece assembly to be created. This architecture furthermore allows the number of interfaces between the mechanical elements to be reduced.

Document U.S. Pat. No. 6,321,448 B1 discloses a method of producing an external turbine engine blade. The method comprises a succession of several stages, including the cutting of a plate such that the dimensions thereof correspond to the outer sides of the external shroud of the casing, bending of the cut plate to form a tube, laser-cutting of the plate to create openings according to the blade profiles, then insertion and welding of the blades in their openings for final fixing. This method allows the time taken to position and adjust the blades in the tube forming the casing to be reduced. However, this method requires accurate cuts to be made, the existence of which weakens the casing. The blade welding operation is expensive, since it has to be carried out in a vacuum. This type of welding increases the preparation and processing time of the projections. The welds at the level of the openings reduce the stator's fatigue strength.

SUMMARY

The aim of the invention is to solve at least one of the problems posed by the prior art. To be more precise, the aim of the invention is to simplify the welding of a stator comprising welded blades onto an external shroud. The invention likewise aims to reduce the cost of producing a turbine engine stator. The invention likewise aims to reduce the aerodynamic losses at the level of the stator, particularly at the level of the internal surface of the external shroud.

The object of the invention is a method of producing an axial turbine engine stator, particularly a compressor stator, the stator comprising an external shroud with an internal surface and an annular row of stator blades extending radially towards the inside from the shroud, the method comprising the following stages: (a) supply or production of a material bar; (b) bending of the bar so that it makes a circle, in order to form an external shroud; (c) welding of a row of blades onto the external shroud; it is notable in that the internal surface of the shroud comprises blade-receiving portions which are generally perpendicular to the radial direction and in that during the welding stage (c), the blades are friction-welded onto the blade-receiving portions.

According to various advantageous embodiments of the invention, during the welding stage (c), the blades are orbital friction-welded.

According to various advantageous embodiments of the invention, after the bending stage (b), the method comprises at least one turning stage of the external shroud.

According to various advantageous embodiments of the invention, the turning stage comprises the production of an external annular groove extending axially to the right of the welds of the blades on the shroud and in various instances an internal tubular support intended to receive an annular seal and formed at a distance axially from the welds.

According to various advantageous embodiments of the invention, the turning stage comprises the formation of an annular bead which extends radially towards the outside and which is disposed axially to the right of the welds of the blades on the shroud.

According to various advantageous embodiments of the invention, the method comprises a milling stage of the shroud, so as to form blade stubs on the external shroud, the milling stage being realized after the bending stage (b) and the blade-receiving portions being formed on the stubs.

According to various advantageous embodiments of the invention, following the bending stage (b), the method comprises at least one turning stage of the external shroud and the milling stage is realized after the turning stage.

According to various advantageous embodiments of the invention, the method comprises a milling stage of the bar, so as to form blade stubs on the bar, the milling stage being realized before the bending stage and the blade-receiving portions being formed on the stubs.

According to various advantageous embodiments of the invention, the external shroud comprises a generally annular wall with a rotational profile extending mainly axially, the radial height H of the stubs is in various instances greater than the thickness E2 of the annular wall, in various instances at least two times greater, for example at least three times greater.

According to various advantageous embodiments of the invention, during the welding stage (c) at least one or every blade is welded while being rubbed against a receiving portion according to a movement comprising a component along the chord of the blade.

According to various advantageous embodiments of the invention, the blade-receiving portions form an annular row of planar surfaces or a generally tubular or truncated annular surface.

According to various advantageous embodiments of the invention, the external shroud comprises a generally annular wall with a rotational profile extending mainly axially and at least one, in various instances at least two, annular fixing flanges extending radially towards the outside, each annular flange being disposed at one axial end of the annular wall.

According to various advantageous embodiments of the invention, the gap between two neighboring blades is smaller than the radial height of the neighboring blades, the row of stator blades comprises at least forty blades, in various instances at least one hundred blades.

According to various advantageous embodiments of the invention, the external shroud and the blades are made of a metallic material, particularly titanium, or the external shroud and the blades are produced from thermoplastic polymer materials.

According to various advantageous embodiments of the invention, the surfaces of the receiving portions are generally perpendicular to the radial direction and/or generally parallel to the axis, in various instances the rotational axis of symmetry, of the shroud.

According to various advantageous embodiments of the invention, the shroud comprises blade stubs on which the blades are welded.

According to various advantageous embodiments of the invention, at least one or each blade-receiving portion comprises a contour in the form of an aerodynamic cambered blade profile, in various instances with an attack point connected to an escape point by a front-side edge and a back-side edge.

According to various advantageous embodiments of the invention, the external shroud comprises fixing means disposed upstream and downstream of each row of blades, the fixing means are in various instances formed on annular fixing flanges.

According to various advantageous embodiments of the invention, the maximum thickness of at least one stub is greater than the maximum thickness of the associated blade, in various instances three times greater.

According to various advantageous embodiments of the invention, the rotational profile of the annular wall is tilted with respect to the rotational axis of the axial turbine engine.

According to various advantageous embodiments of the invention, the method further comprises a peripheral machining stage of the welds between the blades and the outer shroud, in various instances between the blades and the stubs.

According to various advantageous embodiments of the invention, the bar is straight during the supply or production stage.

According to various advantageous embodiments of the invention, at least one or each blade is friction-welded by applying a generally radial force towards the outside.

According to various advantageous embodiments of the invention, the passage between two neighboring blades in the row exhibits a smaller width at the chord of the blades.

According to various advantageous embodiments of the invention, at the end of the bending stage, the external shroud is an unwrought external shroud.

The aim of the invention is likewise a method of producing a turbine engine comprising a stator, characterized in that the stator conforms to the invention, the turbine engine in various instances comprises a plurality of stators each with an external shroud associated with a row of blades, each stator conforming to the invention, and the stators being fixed axially to one another.

The invention makes the welding of the blades easier, as it is free from the preparations required for laser welding. The time taken to produce each weld is shorter. The positioning of protectors between the blades is simply done away with, which reduces workforce requirements. The welding can be carried out in ambient air without filler metal, which reduces costs still further.

Friction welding is advantageous on a previously bent shroud, as there are fewer thermal effects. The removal of any internal stresses diminishes, just as the possible deformations that can occur.

The invention allows the weld to be spaced further away from the wall of the shroud. Hence, the zone affected thermally no longer degrades the mechanical resistance. The invention eliminates any axial safety distances between a weld and a flange or a step shape. The shroud design becomes less constrained as reinforcements can be added to the shroud, to the right of the welds. The welds are no longer on the wall of the shroud, which prevents the flow along its internal surface from being detrimentally affected. The blades can be welded directly via their aerodynamic vanes, the production of specific portions, such as welding platforms, is saved on.

DRAWINGS

DETAILED DESCRIPTION

In the following description, the terms "inner" or "internal" and "outer" or "external" relate to a position in respect of the rotational axis of an axial turbine engine. The radial direction is perpendicular in relation to the rotational axis.

Figure 1:
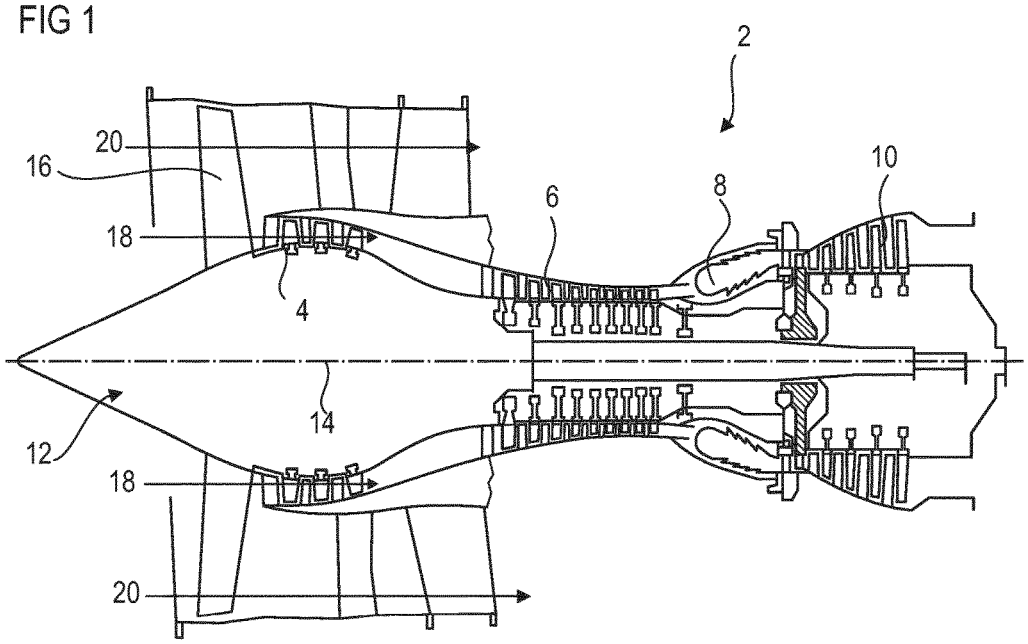
FIG. 1 represents an axial turbine engine according to various embodiments of the invention.

FIG. 1 depicts an axial turbine engine in simplified form. In this particular case it is a double-flow turbojet engine. The turbojet engine 2 comprises a first compression level referred to as a low-pressure compressor 4, a second compression level referred to as a high-pressure compressor 6, a combustion chamber 8 and one or a plurality of turbine levels 10. During operation, the mechanical power of the turbine 10 transmitted via the central shaft to the rotor 12 sets the two compressors 4 and 6 in operation. The compressors comprise a plurality of rows of rotor blades associated with rows of stator blades. The rotation of the rotor about its rotational axis 14 thereby allows an air flow rate to be generated and progressively compressed up to the inlet of the combustion chamber 8.

An input blower commonly referred to as a fan 16 is coupled with the rotor 12 and generates an air flow that is divided up into a primary flow 18 crossing the different levels of the turbine engine referred to above and a secondary flow 20 crossing an annular conduit (partially represented) along the engine before it joins up with the primary flow again at the turbine outlet. The secondary flow can be accelerated so as to generate a thrust reaction. The primary flow 18 and secondary flow 20 are annular flows; they are channelled through the casing of the turbine engine. To this end, the casing exhibits cylindrical walls or shrouds that can be internal or external.

Figure 2:
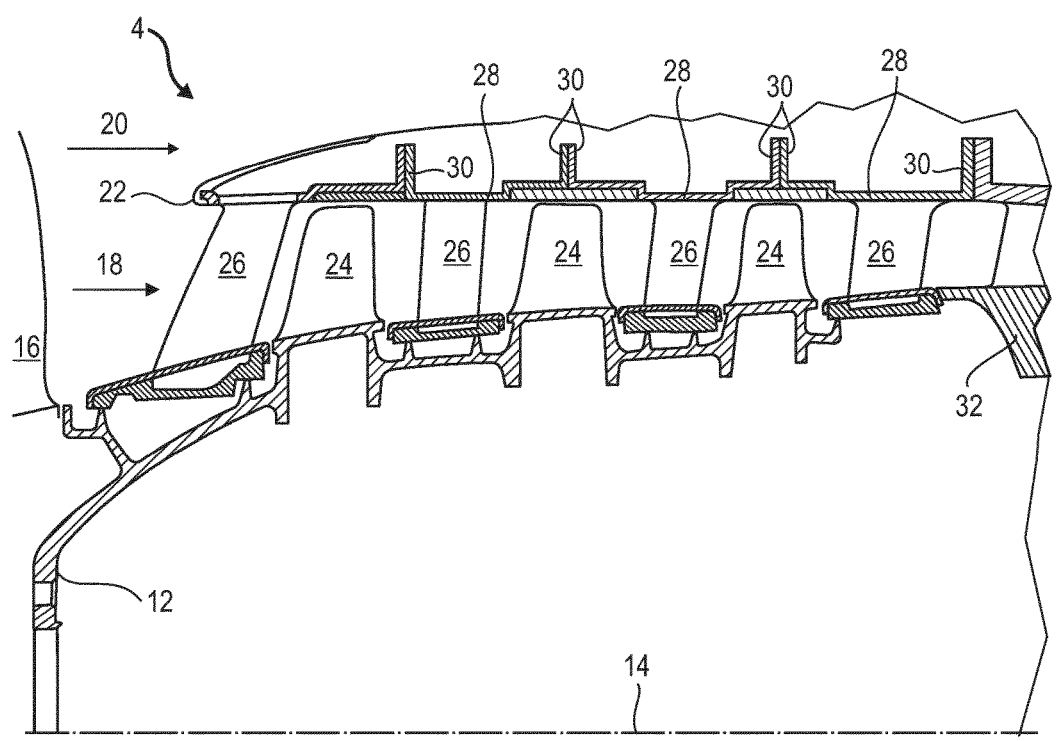
FIG. 2 is a diagram of a turbine engine compressor according to various embodiments of the invention.

FIG. 2 is a sectional view of a compressor of an axial turbine engine 2 such as that shown in FIG. 1. The compressor can be a low-pressure compressor 4. It is possible to see here part of the fan 16 and the separation spout 22 of the primary flow 18 and of the secondary flow 20. The rotor 12 comprises a plurality of rows of rotor blades 24, in this case three.

The compressor 4 comprises a stator with external shrouds 28 each associated with a row of stator blades 26, so as to form a plurality of guide vane assemblies, in this case four. The guide vane assemblies are associated with the fan 16 or with a row of rotor blades to guide the flow of air, so as to convert the flow rate into pressure.

The stator can comprise a plurality of external shrouds 28 which are fixed to one another. They can comprise annular fixing flanges 30 which cooperate with the flanges 30 of the neighboring blades or with the intermediate casing 32, or with the separation nozzle 22. The external shrouds 28 can each comprise cylindrical supports which are male and/or female to form bore shaft fittings guaranteeing that the shrouds are in alignment.

Figure 3:
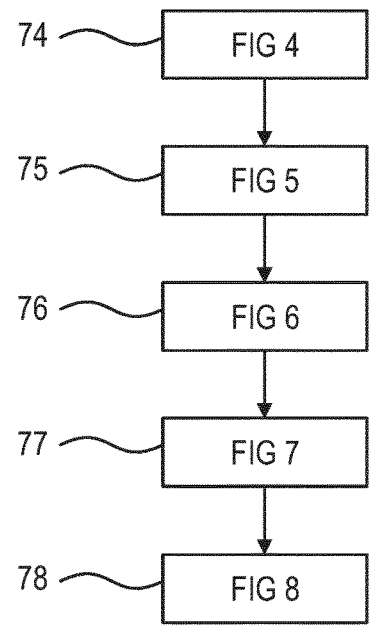
FIG. 3 is a diagram of the production method of an axial turbine engine stator according to various embodiments of the invention.

FIG. 3 depicts a method of producing a stator according to an exemplary first embodiment of the invention.

The method can comprise the following stages, in various instances carried out in this order:
  supply or production 74 of a material bar;
  machining 75 of a face of the bar, particularly by milling, so as to form zones or portions therein to receive blades, such as blade stubs;
  bending 76 of the bar so as to make a closed loop to form an unwrought external shroud;
  turning 77 of the unwrought external shroud;
  friction welding 78 of blades on the inside of the external shroud, in various instances on the blade stubs.

The method can comprise repetition of the preceding stages, so as to form a plurality of external shrouds. The method then involves the different shrouds previously produced being moved towards one another axially and fixed to one another.

Figure 4:
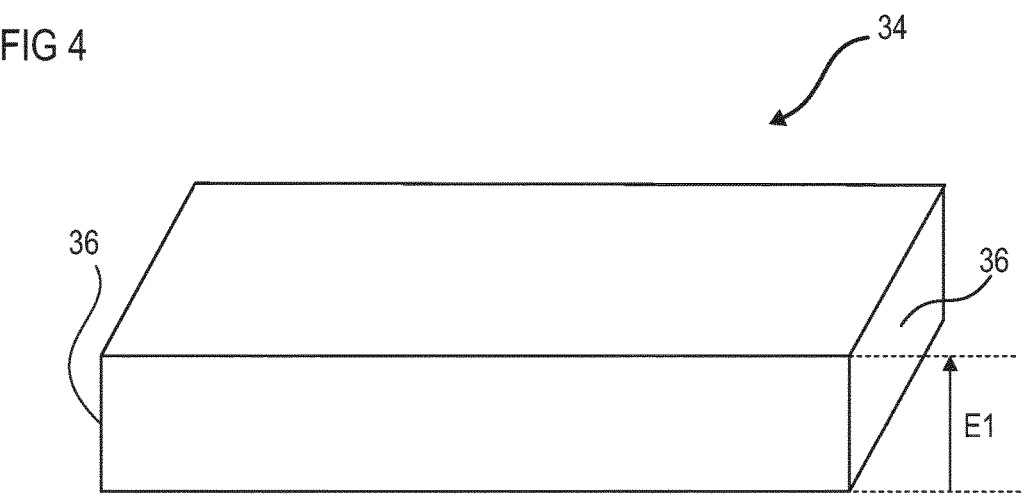
FIG. 4 depicts the supply stage of a bar according to various embodiments of the invention.

FIG. 4 depicts the supply or production stage of a material bar 34.

The bar 34 constitutes the raw material for producing the shroud. It can be generally straight, such as a quadrangular section profile, in various instances solid. Bar is understood to mean an elongated member with parallel sides and ends 36. The thickness E1 of the bar is greater than 1 cm, in various instances greater than 2 cm, for example greater than 4 cm; the bar 34 is wider than it is thick.

The bar 34 can be made by hot rolling. It can be made from titanium, aluminium or steel. It can likewise be produced from polymer, particularly from a thermoplastic material. The blades are advantageously made of the same material.

Figure 5:
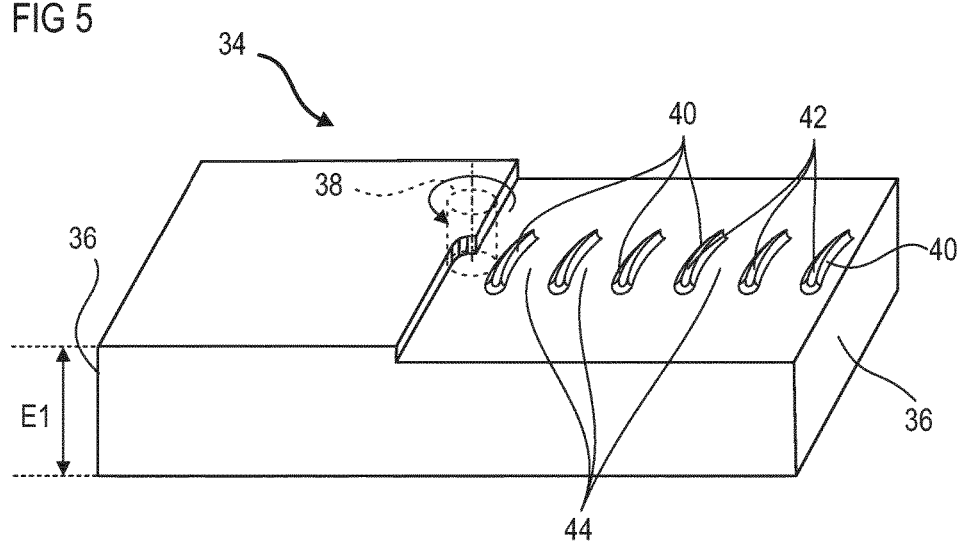
FIG. 5 illustrates a stub milling stage in the bar according to various embodiments of the invention.

FIG. 5 represents the machining stage of the bar, particularly by milling.

The machining can be carried out with the help of a cutting tool such as a milling cutter 38. It can be carried out and/or completed using a stock removal method such as electro-erosion. The machining can allow the blade stubs 40 to be formed and/or delimited. The bar 34 is machined in its thickness by cutting into it zones 44 with smaller thicknesses, between which zones are left the optional stubs 40 which form ribs.

The stubs 40 which are produced form blade-receiving portions 42. Their peaks or ends can be joined with the jacket of the unwrought bar and/or can exhibit aerodynamic profile forms which each coincide with the profile of the blade which will be welded there. Each receiving portion 42 is flat and can be delimited by at least two arcs which can be cambered in the same direction. The height of at least one stub 40, in various instances of each stub, is greater than the width of its receiving portion 42, and therefore of the associated blade.

Figure 6:
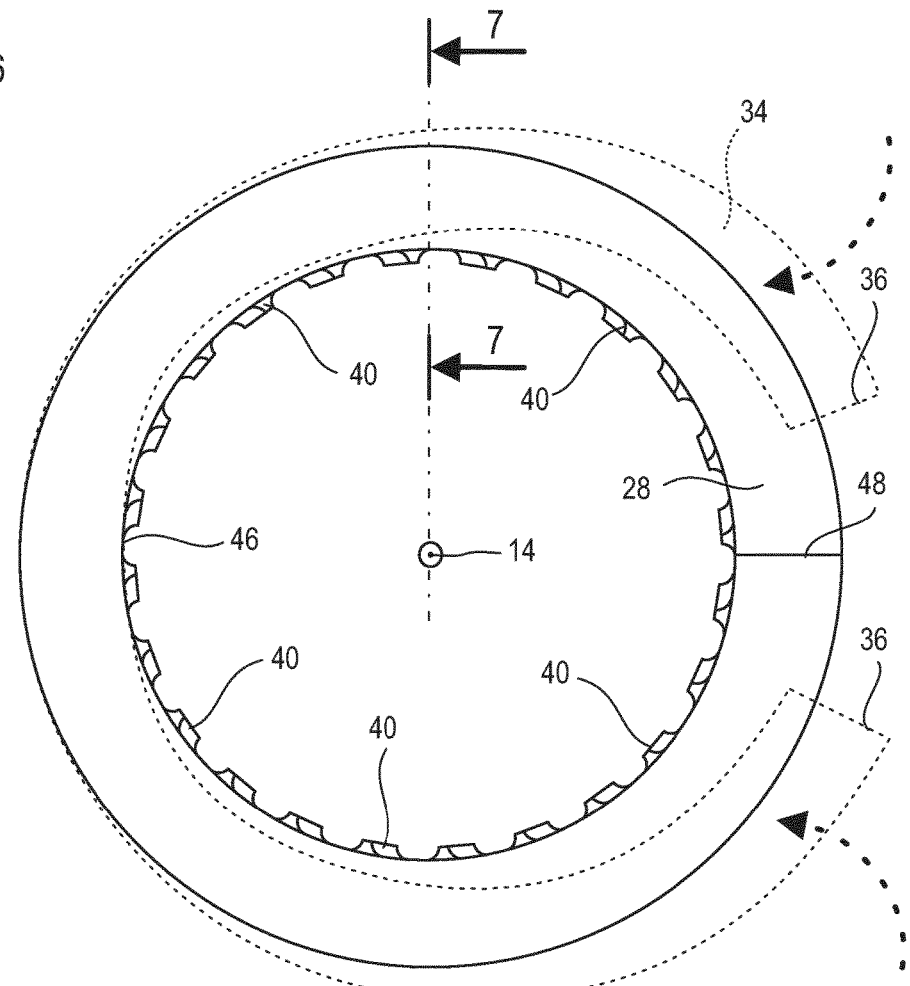
FIG. 6 depicts the bending stage of the bar according to various embodiments of the invention.

FIG. 6 depicts the bending stage of the bar 34 according to the exemplary first embodiment of the invention, so as to form an external shroud 28. The external shroud 28 thereby produced can be unwrought, in the sense that certain machining operations can be required before its final form is achieved.

The internal surface 46 of the shroud comprises blade-receiving portions 42. During bending, these blade-receiving portions are turned towards the inside of the external shroud opposite the axis 14 of symmetry of the shroud which coincides with the rotational axis 14 of the turbine engine. The receiving portions 42 form an annular row of uniformly distributed surfaces.

The bar 34 is bent, its opposite ends 36 are moved closer to one another by bending it round. The bending can allow a single-turn loop to be produced. The bending can be carried out cold, in other words at ambient temperature. The material can be plastically deformed, particularly in the case of a metal bar. It can be possible to perform hot bending, in various instances in the case of a bar made of thermoplastic polymer in which the material is taken beyond its glass transition.

The bar 34 can be bent in different ways. It is arched, in various instances by successive passes between rollers, progressively altering its curvature. It can also be bent by coiling, by pressure or by rolling.

The bending stage can comprise the making of a weld 48 between the ends 36 of the bar 34, in order to close the loop. The bar then becomes a continuous ring with a rotational symmetry.

Carrying out the bending after milling brings with it the advantage that this deformation is performed on a smaller thickness which reduces the mechanical deformation forces required, in the same way as the deformation in respect of the neutral axis.

Figure 7:
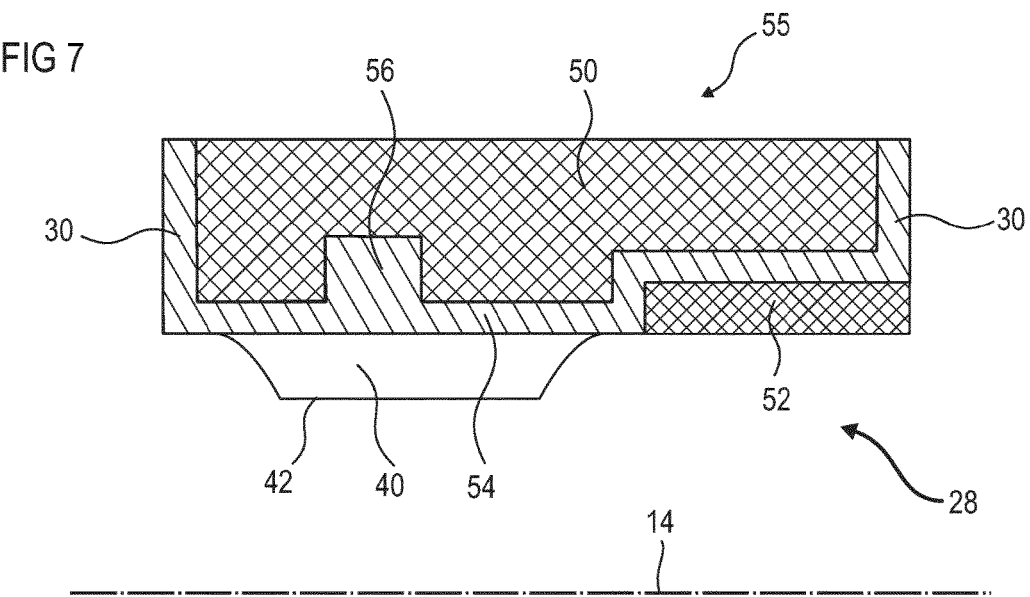
FIG. 7 shows in schematic form the turning stage of the unwrought external shroud according to various embodiments of the invention with the help of a section through the shroud following the axis 7-7 drawn in FIG. 6.

FIG. 7 depicts the machining stage by turning the unwrought external shroud 28 according to the exemplary first embodiment of the invention.

The turning stage of the unwrought external shroud 28 can comprise at least one, in various instances at least two, turning zones, namely external turning 50 and internal turning 52, which allow an annular wall 54 to be formed which extends mainly axially. This wall 54 exhibits a rotational profile in respect of the axis 14. On the outside, the turning can allow an annular groove 55 to be cut which is delimited by at least one annular fixing flange 30, in various instances by two annular flanges 30. Each flange 30 extends radially and is disposed at an axial end of the shroud to allow fixing with an axially disposed member. The flanges can subsequently be drilled to realize fixing means, such as holes. On the inside, the turning can allow a groove to be formed to receive a seal.

The turning stage can allow a reinforcing annular bead 56 to be produced. It creates a stiffening belt forming a radial thickening of the external shroud 28 or, more precisely, of its annular wall 54. The bead 56 can be disposed axially at the level of the receiving portions 42 where the blades are welded, since the welds are separated from the bead by the annular wall 54 and in various instances by the stubs 40. The presence of the bead 56 increases the thermal inertia during welding and limits shrinkage. It can help to stiffen the external shroud 28 during friction welding.

Figure 8:
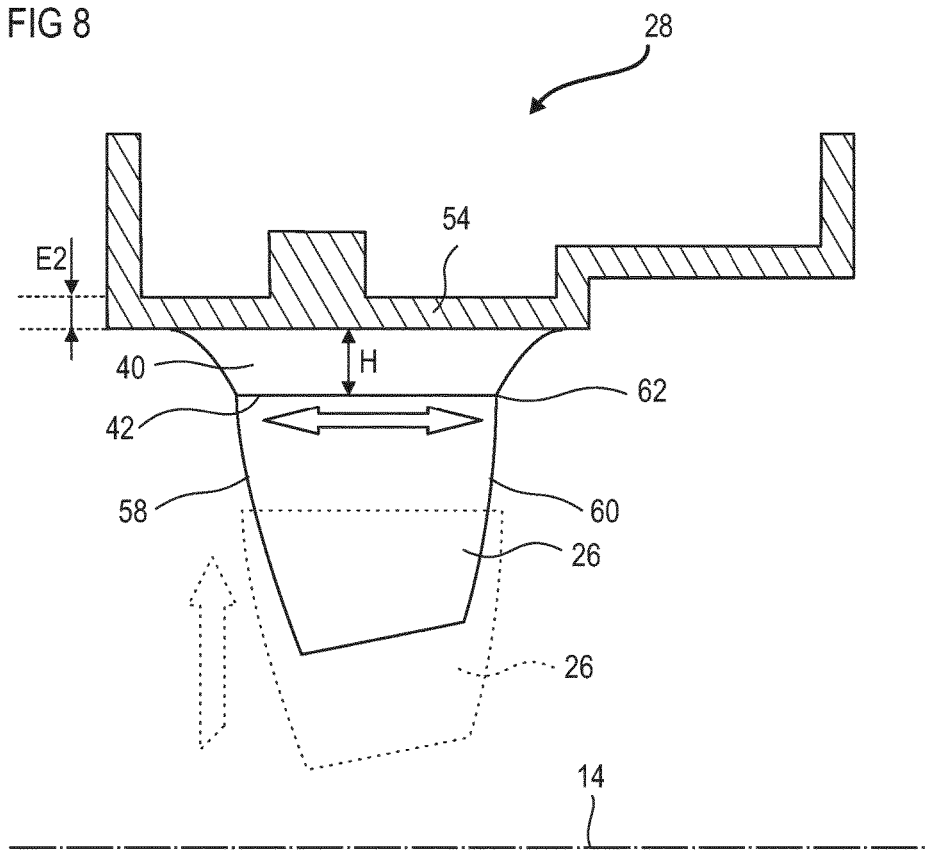
FIG. 8 represents the blade welding stage onto the external shroud according to various embodiments of the invention.

FIG. 8 depicts the blade welding stage 26 on the external shroud 28 according to the exemplary first embodiment of the invention. At the start of this stage, the external shroud 28 can already exhibit its final form, to the extent that it or its rotational profile no longer undergoes stock removal.

The welded blades 26 can each comprise a leading edge 58 and a trailing edge 60, both projecting. They can each comprise a lower surface and an upper surface, both being cambered. The blades 26 form wings or sheets of material which can be cambered and curved. Their size accelerates the cooling of their welds 62.

The stubs 40 form blocks of material which can be wider than the blades 26 which are welded to them. The radial heights H of the stubs 40 can be greater than the general thickness E2 of the annular wall 54 of the shroud 28, the height of the stubs 40 being measured according to the general thickness E2 of the wall. The stubs 40 can be blade roots and can exhibit connecting radii to the shroud, in order to allow a distribution of forces. The solid aspect of the stubs 40 allows the shroud 28 to be reinforced and, likewise, thermal inertia to be provided during welding.

The blades 26 can be friction-welded to one another. This method is advantageous as it only requires a few seconds, in various instances between two and five seconds, of friction to weld a blade 28. The existence of optional stubs 40 limits the deformation of the wall 54 during and after friction, by forming cushions there.

During welding, the blades 26 are pressed against the receiving portions 42 being displaced by a frictional movement. The pressure is mainly radial and can be inclined so as to remain perpendicular to the surface of each receiving portion 42. The welding comprises a friction phase allowing the rise in temperature of the joint between the blade 26 and the shroud 28 until it becomes pasty. At the same time as the frictional movement, a radial force is applied to the shroud 28 via the welded blade 26. The frictional movement can comprise a component following the chord of the blade 26, in order to benefit from its rigidity in this direction. The frictional movement can be orbital, for example to adjust to the cambered form of the blades 26. There follows an immobilization phase during which the blades are immobilized in relation to the shroud, while maintaining the radial force during the solidification time of the weld 62.

A welding device can be adapted to the welding of blades 26 onto an external shroud 28. The device can comprise a support with a supporting surface which fits the outside of the external shroud 28 closely to avoid deforming it. The device can likewise be adapted to allow the gripping of the blades 26 from the inside of the shroud and/or by adapting to the presence of neighboring blades.

Figure 9:
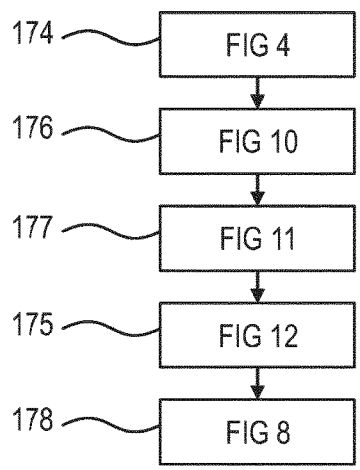
FIG. 9 is a diagram of the production method for an axial turbine engine stator according to various embodiments of the invention.

FIG. 9 depicts a method of producing a stator according to an exemplary second embodiment of the invention. This FIG. 9 adopts the system of numbering used in the preceding figures for identical or similar components, the numbering being increased by 100, however. Specific numbers are used for components specific to this embodiment.

The method can comprise the following stages, in various instances carried out in this order:

supply or production 174 of a substantially unwrought bar;

bending 176 of the bar so as to make a circle to form an unwrought external shroud;

turning 177 of the unwrought external shroud;

machining 175 of a face of the bar, particularly by milling, so as to form blade stubs there;

friction welding 178 of blades on the inside of the external shroud, for example against the shroud stubs.

The supply or production stages 174 of the bar and/or the welding stages 178 of the blades can be carried out in an identical manner to the exemplary first embodiment of the invention. This embodiment is distinguished from the preceding one by the sequence of certain operations, due to the fact that the stubs can be formed on the unwrought shroud directly rather than on the bar.

In this embodiment of the invention, the order in which the turning and milling stages involved in forming the stubs is carried out can be reversed.

The method can involve repeating preceding stages, so as to form a plurality of external shrouds. The method then involves the shrouds produced previously being assembled axially and fixed to one another.

Figure 10:
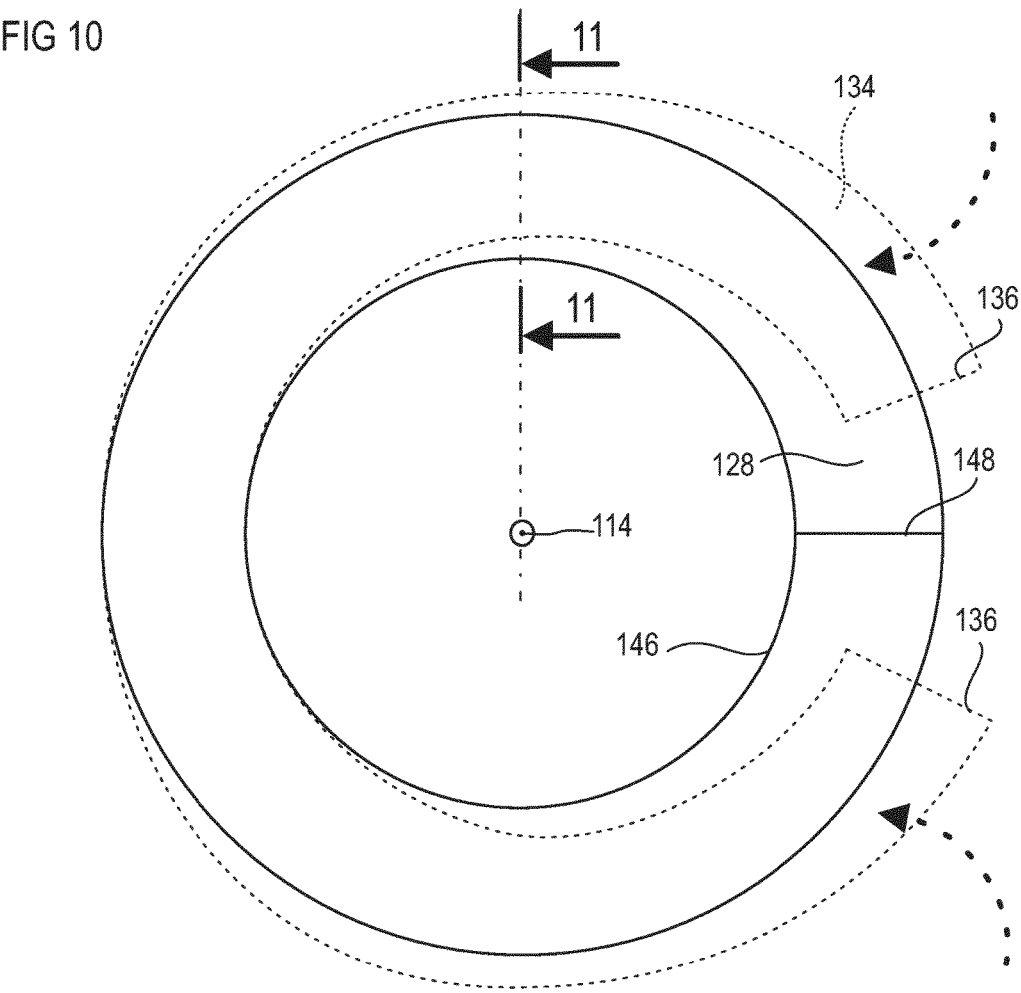
FIG. 10 depicts the bending stage of the bar according to various embodiments of the invention.

FIG. 10 depicts the bending stage of the bar 134 according to the exemplary second embodiment of the invention, so as to form an external shroud 128 with an annular internal surface 146.

The bar 134 retains its smooth surfaces and is, in particular, free from stubs.

The bending can be carried out as described in the exemplary first embodiment of the invention. This bending stage can differ due to the absence of stubs, which means there is a greater support surface for carrying out the bending and therefore more options for disposing the bending rollers or any other tool required. The absence of stubs allows work to be carried out on a more homogeneous part, since the stubs can stiffen the bar locally.

Figure 11:
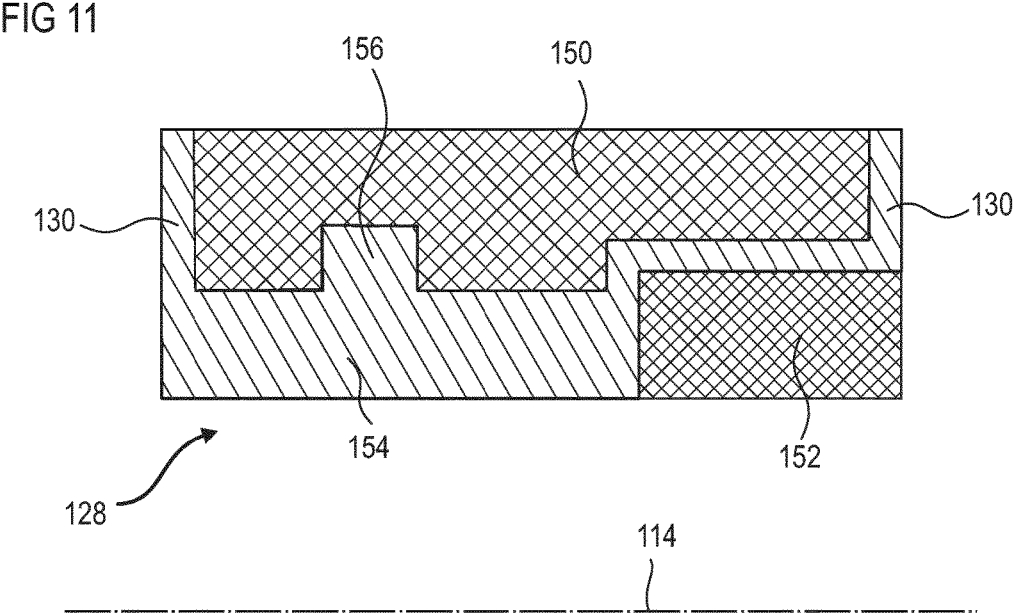
FIG. 11 shows in schematic form the bending stage of the unwrought external shroud according to various embodiments of the invention, with the help of a section through the shroud following the axis 11-11 drawn in FIG. 10.

FIG. 11 depicts the turning stage of the unwrought external shroud 128 according to the exemplary second embodiment of the invention.

The turning stage of the unwrought external shroud 128 is similar or identical to that presented in the exemplary first embodiment of the invention, one difference in various instances being the absence of stubs at this stage in the process. This turning stage according to the exemplary second embodiment can be distinguished in that the internal turning 152 is thicker. This stage can make it possible to produce fixing flanges 130, a bead 156 and an unwrought annular wall 154, thanks in part to the external turning 150.

Figure 12:
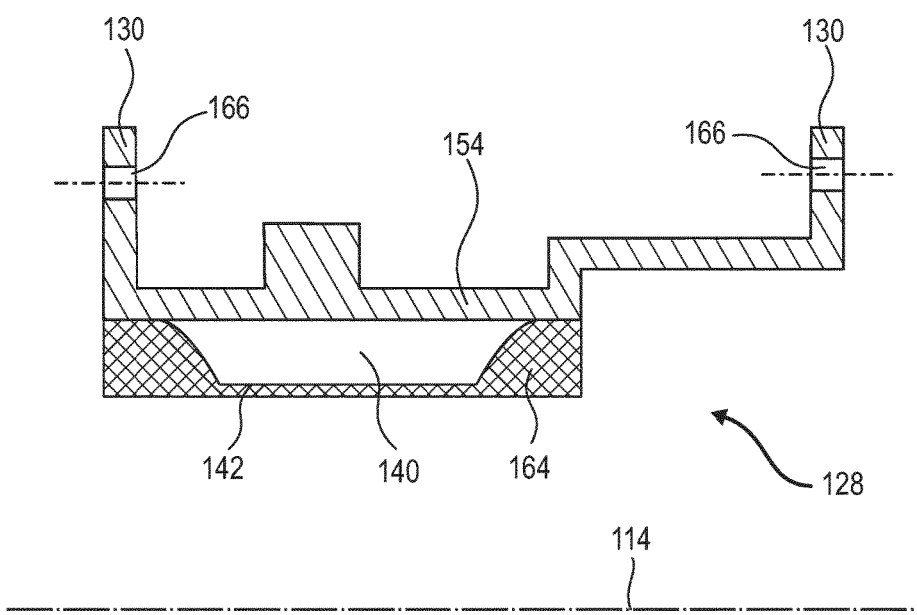
FIG. 12 illustrates a stub milling stage in the unwrought external shroud according to various embodiments of a second embodiment of the invention.

FIG. 12 depicts the machining stage, particularly by milling, of the unwrought external shroud 128 according to the exemplary second embodiment of the invention. This stage enables the annular wall 154 to be completed.

The stock removed 164 during the milling of the unwrought external shroud 128 can allow the same stubs 140 to be produced and/or the same receiving portions 142 as those described in the exemplary first embodiment of the invention, one difference being that the milling is carried out on an annular part and not on a flat, straight part. This machining can be realized as presented in the exemplary first embodiment. Performing the milling after the bending allows a shorter part to be milled, which reduces the size of the cutter required. This machining can allow fixing holes 166 to be produced, in various instances disposed on the flanges 130, on the same machine as that used to machine the shroud.

Moreover, performing the turning prior to the milling allows the rigidity of the unwrought shroud to be retained during a turning stage. During turning, the pass depths can be increased by this, which reduces the fabrication time. The zone in which the stubs 140 have to be cut form a reinforcement which, moreover, simplifies the fixing of the shroud 128 on its turn.

Generally speaking, for each production method of the stator according to the invention, each turning stage of the unwrought external shroud is optional, because the shroud can essentially be a tube, whereof the wall thickness is constant. The turning can also be replaced by milling. Any recess in the external shroud can be made by milling. The annular fixing flanges can be connected, for example welded, onto the axial ends of the external shroud.

Likewise, for each method of producing the stator according to the invention, each milling stage or at least each stub production stage is optional, since the blades can even be welded to a surface of the bar or an internal shroud surface which forms the receiving portions. Each method can comprise an application stage of a sealing gasket against the internal surface of the internal shroud. A seal of this kind can be an annular layer of abradable material. The shroud can in various instances be turned after the blade welding stage.

According to the invention, it is possible to produce external shrouds according to the different embodiments of the invention, then to assemble them.

The invention claimed is:

1. A method of producing an axial turbine engine stator, the stator comprising an external shroud with an internal surface and an annular row of stator blades extending radially towards the inside from the external shroud, the method comprising the following stages, performed in that order:
   a) supplying a material bar;
   b) bending of the bar so that it makes a circle, in order to form an external shroud; and
   c) welding a row of blades onto the external shroud, wherein the internal surface of the external shroud comprises blade-receiving portions that are generally perpendicular to the radial direction and are formed on blade stubs; and during the welding stage (c), the blades are friction-welded onto the blade-receiving portions.

2. The method according to claim 1, wherein during the welding stage (c), the blades are orbital friction-welded.

3. The method according to claim 2, wherein after the bending stage (b), the method comprises at least one turning stage of the external shroud.

4. The method according to claim 3, wherein the turning stage comprises the production of an external annular groove extending axially to the right of the welds of the blades on the shroud and an internal tubular support intended to receive an annular seal and formed at a distance axially from the welds.

5. The method according to claim 4, wherein the turning stage comprises the formation of an annular bead that extends radially towards the outside and that is disposed axially to the right of the welds of the blades on the shroud.

6. The method according to claim 5 further comprising a milling stage of the bar, so as to form the blade stubs on the bar, the milling stage being realized before the bending stage.

7. The method according to claim 6, wherein the external shroud comprises a generally annular wall with a rotational profile extending mainly axially, a radial height of the blade stubs being at least two times greater than a thickness of the annular wall.

8. The method according to claim 7, wherein during the welding stage (c) at least one or every blade of the annular row of stator blades is/are welded while being rubbed against a respective receiving portion of the blade-receiving portions according to a movement comprising a component along the chord of the blade.

9. The method according to claim 8, wherein the blade-receiving portions form an annular row of planar surfaces or a generally tubular or truncated annular surface.

10. The method according to claim 9, wherein the external shroud comprises a generally annular wall with a rotational profile extending mainly axially and at least one, annular fixing flange extending radially towards the outside, each annular flange being disposed at one axial end of the annular wall.

11. The method according to claim 7, wherein the radial height of the blade stubs is at least three times greater than a thickness of the annular wall.

12. The method according to claim 5 further comprising a milling stage of the shroud, so as to form blade stubs on the external shroud, the milling stage being realized after the bending stage (b) and the blade-receiving portions being formed on the stubs.

13. The method according to claim 12, wherein the milling stage is realized after the turning stage.

14. The method according to claim 1, wherein:
   the external shroud and the blades are made of a metallic material; or
   the external shroud and the blades are produced from thermoplastic polymer materials.

15. The method according to claim 14, wherein the external shroud and the blades are made of titanium.

16. A method of producing a turbine engine comprising a plurality of stators, each stator comprising an external shroud associated with a row of blades and be fixed axially to one another, said method of producing the turbine engine comprising a method of producing the stator, wherein the method of producing stator comprising the following stages, performed in that order:
   a) supplying a material bar;
   b) bending of the bar so that it makes a circle, in order to form an external shroud; and
   c) welding a row of blades onto the external shroud, wherein the internal surface of the shroud comprises blade-receiving portions that are generally perpendicular to the radial direction and are formed on blade stubs; and during the welding stage (c), the blades are friction-welded onto the blade-receiving portions.

* * * * *